United States Patent
Zhang (10) Patent No.: US 8,144,724 B2
(45) Date of Patent: Mar. 27, 2012

(54) APPARATUS AND METHOD FOR RESOLVING REQUEST COLLISION IN A HIGH BANDWIDTH WIRELESS NETWORK

(75) Inventor: Xinping Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 11/173,832

(22) Filed: Jun. 30, 2005

(65) Prior Publication Data

US 2007/0002789 A1 Jan. 4, 2007

(51) Int. Cl.
*H04L 12/413* (2006.01)
*H04B 7/212* (2006.01)
*H04B 7/00* (2006.01)
*H04J 3/02* (2006.01)

(52) U.S. Cl. ........ 370/447; 370/445; 370/431; 370/462; 455/515; 455/518; 455/519

(58) Field of Classification Search ................ 370/328, 370/310, 278, 282, 445, 447, 448, 461, 462, 370/431; 455/445, 455, 456.1, 515, 516, 455/517, 518, 519, 526
See application file for complete search history.

(56) References Cited

U.S. PATENT DOCUMENTS

| | | | |
|---|---|---|---|
| 5,227,775 A | | 7/1993 | Bruckert et al. |
| 7,035,276 B2 * | | 4/2006 | Bradford et al. ............. 370/445 |
| 2004/0146019 A1 * | | 7/2004 | Kim et al. ..................... 370/329 |
| 2005/0020213 A1 * | | 1/2005 | Azman et al. ............. 455/67.11 |

FOREIGN PATENT DOCUMENTS

| | | |
|---|---|---|
| EP | 0 994 604 A2 | 4/2000 |
| EP | 1 424 814 A | 6/2004 |
| JP | 2001244913 | 9/2001 |
| WO | WO 00/22872 A | 4/2000 |
| WO | WO2004/006615 | 1/2004 |
| WO | WO2004/064272 A | 7/2004 |

OTHER PUBLICATIONS

International Search Report—PCT/US06/026083, International Searching Authority—European Patent Office, Nov. 22, 2006.
Written Opinion—PCT/US06/026083, International Searching Authority—European Patent Office, Nov. 22, 2006.
International Preliminary Report on Patentability—PCT/US06/026083, The International Bureau of WIPO—Geneva, Switzerland, Jan. 9, 2008.

* cited by examiner

*Primary Examiner* — Wesley Kim
(74) *Attorney, Agent, or Firm* — Raphael Freiwirth (57) ABSTRACT

Apparatus and method for reducing collisions on an enhanced access channel in a high bandwidth wireless network during a push-to-talk (PTT) communication between a plurality of user devices. A random delay field is introduced to a set of access parameters and the random delay is generated at each user device when the user devices are ready to transmit an access probe through the enhanced access channel to a base station. At the end of the random delay, the user devices send the access probe through the enhanced access channel to the base station. A maximum random delay field may be set by the base station.

16 Claims, 5 Drawing Sheets

APPARATUS AND METHOD FOR RESOLVING REQUEST COLLISION IN A HIGH BANDWIDTH WIRELESS NETWORK

BACKGROUND OF THE INVENTION

1. Field of the Invention

The present invention generally relates to wireless telecommunications, and more specifically, relates to a system and method for reducing data collisions in a wireless network.

2. Description of the Related Art

Technology advancement has made mobile telephones or wireless communications devices inexpensive and accordingly ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a handset, uses two frequencies for communicating with the PTT server, one for outgoing and one for incoming communications. The PTT system requires the person who is speaking to press a PTT button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server by informing the server it is ready to transmit. The remote PTT server verifies that no other party is using the communication channel and the channel is available then assigns the channel to the user. The user's message is received by the server and the server sends the message for each and every receiving party. After the message is transmitted to every receiving party, the channel is released and ready for use by other parties.

During the process described above, when two users press their PTT buttons simultaneously, there is a chance that their respective user devices will send simultaneously access probes to a single base station. If the access probes are sent through same frequency radio signals and same communication channel, a collision may happen and the base station will not be able to identify the radio signals. The collision problem is accentuated when multiple user devices served by a single base station respond simultaneously to paging messages transmitted by the base station. After receiving the paging message, each user device sends an access probe back to the base station and these access probes may collide with each other. The collision problem is especially a problem in a high bandwidth wireless network, such as a Code Division Multiple Access 2000 (CDMA2000) compatible network.

Therefore, it is desirous to have an apparatus and method that reduce the collision of access probes transmitted in the high bandwidth network, and it is to such apparatus and method the present invention is primarily directed.

SUMMARY OF THE INVENTION

Briefly described, an apparatus and method of the invention reduce collisions on a reverse enhanced access channel in a high bandwidth wireless network on which push-to-talk (PTT) communications occur between a plurality of user devices. A random delay field is introduced to a set of access parameters and the random delay is generated at the user devices before an access probe is sent to a base station. At the end of the random delay, the user devices send an access probe through the reverse enhanced access channel to the base station. The random delay field may be set by the base station.

In one embodiment, the method is for reducing access probe collisions in a high bandwidth wireless network over which push-to-talk communications occur between a plurality of user devices, wherein access probes are transmitted on a reverse enhanced access channel by the plurality of user devices to a base station. The method includes the steps of receiving at a user device a first message with a maximum delay factor from the base station, generating a delay that is between zero and the maximum delay factor, and at the end of the generated delay, transmitting an access probe over the reverse enhanced access channel to the base station.

In another embodiment, a user device is provided which is capable of transmitting and receiving radio signals, as part of a push-to-talk (PTT) communication, from a remote base station in a high bandwidth wireless communication network on which push-to-talk (PTT) communications occur between a plurality of user devices. The user device includes a transceiver for transmitting and receiving messages from the base station through the high bandwidth wireless communication network, a controller in communication with the transceiver for receiving messages from the base station through the high bandwidth wireless communication network, a storage unit in communication with the controller for storing communication parameters received from the base station, a user interface unit in communication with the controller for interfacing with users, and a random delay generator for generating a random delay based on a communication parameter stored in the storage unit, wherein the random delay generator generates the random delay before the transceiver transmitting an access probe through a reverse enhanced access channel to the base station.

The present apparatus and methods are therefore advantageous as they reduce access probe collisions at the base station in a high bandwidth wireless communication network during a PTT communication. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," and "user device" are used interchangeably. The terms "connection parameters" and "access parameters" are also used interchangeably. The term "application" as used herein is intended to encompass executable and nonexecutable software files, raw data, aggregated data, patches, and other code segments. The term "exemplary" means that only an example is shown, and does not indicate any preference for the elements or embodiments described. Further, like numerals refer to like elements throughout the several views, and the articles "a" and "the" includes plural references, unless otherwise specified in the description.

In overview, the present system and method reduce collisions on a reverse enhanced access channel during a PTT communication in a high bandwidth wireless network by introducing a random delay at a user device before an access probe is sent. The random delay can be generated at a chip level according to a random delay field introduced on a set of access parameters broadcasted by a base station. The random delay can also be generated at user devices, and at the end of the random delay, the user devices send an access probe through the reverse enhanced access channel to the base station. The random delay, however, cannot exceed a maximum delay set by the base station.

Figure 1:
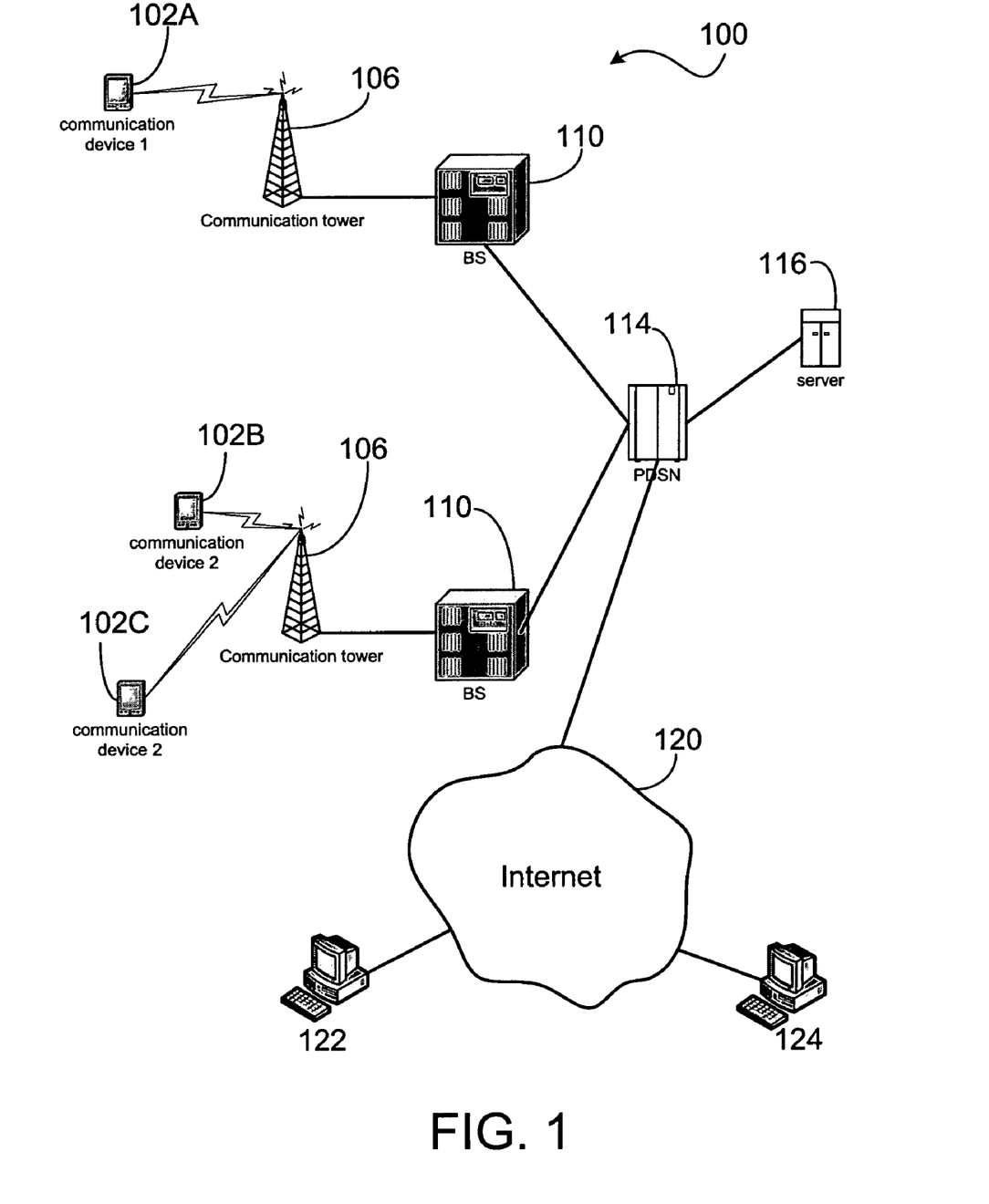
FIG. 1 depicts an exemplary embodiment of a communication network.

FIG. 1 depicts a communication network 100. The communication network 100 includes one or more communication towers 106, each connected to a base station (BS) 110 and serving users with communication device 102[A-C]. The communication devices 102[A-C] can be cellular telephones, pagers, personal digital assistants (PDAs), laptop computers, or other hand-held, stationary, or portable communication devices that support push-to-talk communications. The commands and data input by each user are transmitted as digital data to a communication tower 106. The communication between a user using a communication device 102 and the communication tower 106 can be based on different high bandwidth wireless technologies, such as code division multiple access 2000 (CDMA2000) or other compatible wireless technologies.

The PTT communications are transmitted through data packets over the communication network 100. The wireless communication device 102 sends and receives audio data packets on an assigned communication channel. The data packets from each device 102 is sent from the communication tower 106 to a base station (BS) 110, and forwarded to a packet data serving node (PDSN) 114, which may be connected to the Internet 120. The PDSN 114 may be connected to a server 116 that supports the PTT feature in the communications network 100. Optionally, the base station 110 and the server 116 may be part of the PDSN 114. The server 116 may also suppress transmission of PTT communication to a particular wireless device upon request from that device. The data packets are forwarded by the server 116 to the receiving wireless device 102 where an audio stream will be constructed based on the data in the data packets. In an alternative embodiment (not shown), the PDSN 114 may not needed in a data-only network. The data packets are sent by the BS 110 to a packet data serving node and/or other servers for processing. The data packets are transmitted between the wireless device 102 and the server 116 according to predefined protocols such as User Datagram Protocol/Internet Protocol (UDP/IP), Real-time Transport Protocol (RTP), Transfer Control Protocol/Internet Protocol (TCP/IP), or other suitable protocols.

A user at the communication device 102A can communicates with users at the communications 102B and 102C through a PTT communication. When the user at the communication device 102A activates the PTT feature to talk to the users at the communication devices 102B and 102C, both communication devices 102B and 102C will be paged by the communication tower 106. Each communication device 102B and 102C respond to the paging after a random delay, so the chance of collision of radio signals from these two communication device are minimized.

Figure 2:
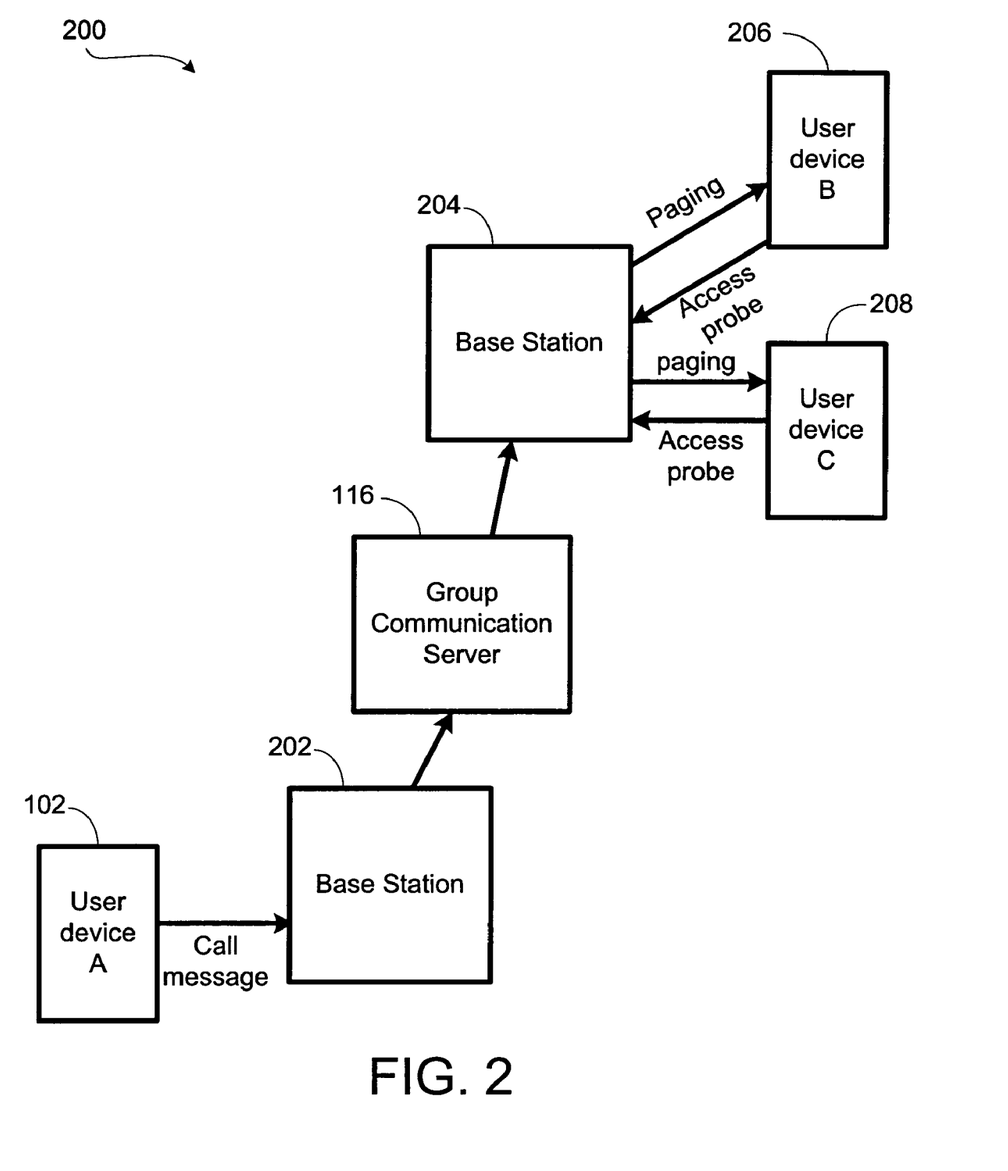
FIG. 2 is a diagram representing interactions between the server and wireless devices during a set up process for a PTT communication.

FIG. 2 illustrates a simplified diagram 200 representing interaction among an originating user device 102, an originating base station 202, a server (also known as group communication server) 116, a terminating base station 204, and two targeted user devices 206 and 208. The originating wireless device 102, when ready to engage in a PTT communication, sends a call message through the originating base station 202 to the server 116. The server 116 verifies the availability of a communication channel for the PTT communication and sends announce messages to the targeted devices 206 and 208 through the terminating base station 204. The announce messages are queued at the terminating base station 204 until the targeted wireless devices 206 and 208 are located. The terminating base station 204 sends paging messages through a control channel or paging channel to the targeted wireless devices 206 and 208.

After receiving the page message, the targeted wireless devices 206 and 208 sends access probes back to the terminating base station 204 through a reverse enhanced access channel. The access probe is sent after each wireless device 206 and 208 generates a random delay and the random delay expires. The random delay has a maximum set by the base station 204 through a periodic message that is broadcasted by the base station 204. The base station 204 broadcast periodically overhead messages with connection parameters to all the wireless devices within its coverage range. After receiving the access probes from the targeted wireless devices 206 and 208, the terminating base station 204 sets up communication channels between the base station 204 and the targeted wireless devices 206 and 208 and delivers the announce message to the targeted wireless devices 206 and 208. The targeted wireless devices 206 and 208 acknowledge the announce message, and the acknowledgement messages are forwarded by the base station 204 to the server 116. After confirming the targeted wireless devices 206 and 208 are available, the server 116 sends a status message to the originating wireless device 102. The originating wireless device 102 can then start to transmit the PTT communication.

Figure 3:
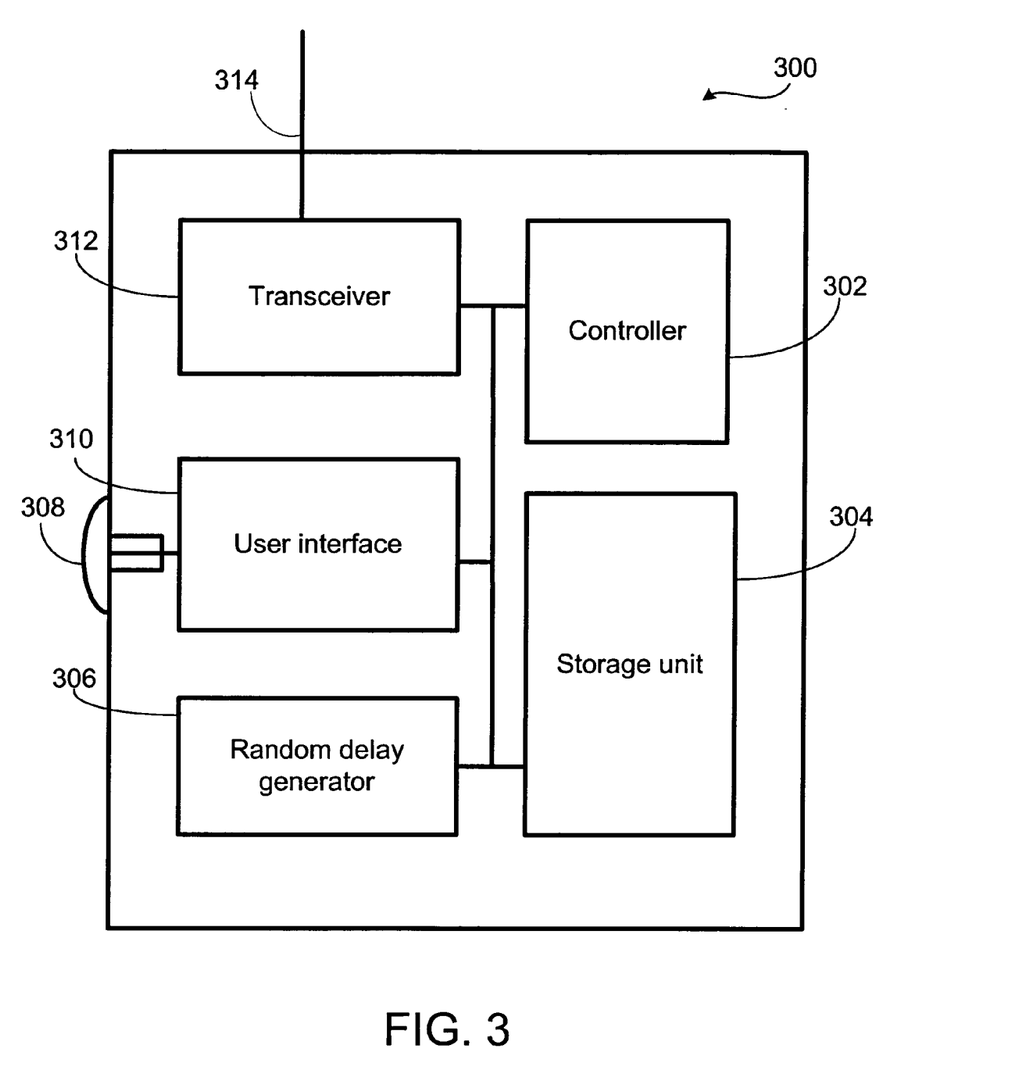
FIG. 3 is an exemplary embodiment of an architecture of a wireless device.

FIG. 3 illustrates a block diagram 300 of one embodiment of a wireless handset 102. The wireless handset 102 includes a controller 302, a storage unit 304, a random delay generator 306, a user interface unit 310, a push-to-talk activation unit 308, a transceiver 312, and an antenna 314. The controller 302 can be hardware, software, or a combination thereof. The controller 302 oversees communications with a communication server. The storage unit 304 may store connection or communication parameters received from a base station. The random delay generator 306 generates a delay according to the communication parameters received from the base station. The random delay may be zero chip, few chips, or as long as the maximum delay set by the base station, wherein the chip is defined as an output digit of a spreading code generator. In CDMA, one information 'bit' is encoded into several 'code symbols,' and a single 'code symbol' is spread into several 'chips.' The random delay can be generated according to any method known to those skilled in the art. The user interface unit 310 controls hardware, such as speaker, microphone, display unit, and push-to-talk activation button 308 used for communication with the user. The transceiver 312 transmits and receives radio signals to and from a communication tower 106. The controller 302 interprets commands, messages, and data received from the user and the communication network 100.

Figure 4:
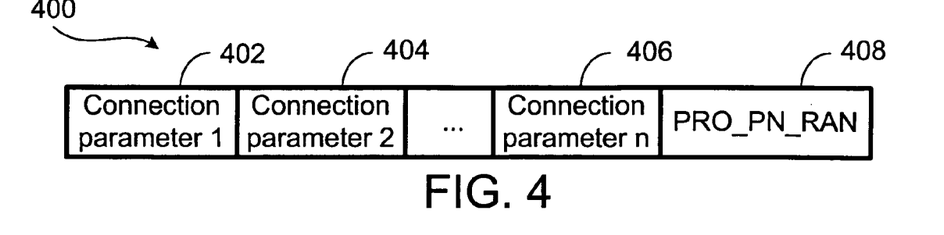
FIG. 4 is an exemplary embodiment of a message with connection parameters.

The base station 110 periodically broadcasts connection parameters to all user devices within its coverage area. The connection parameters are broadcasted in overhead messages. An example of such parameters including a parameter for maximum random delay (PRO-PN-RAN, 408) is shown in FIG. 4. Other parameters are, e.g., Connection parameter 1, 402, Connection parameter 2 404, Connection parameter n 406. The maximum random delay 408 indicates an upper limit for the random delay that each user device may employ before dispatching an access probe to the base station.

Figure 5:
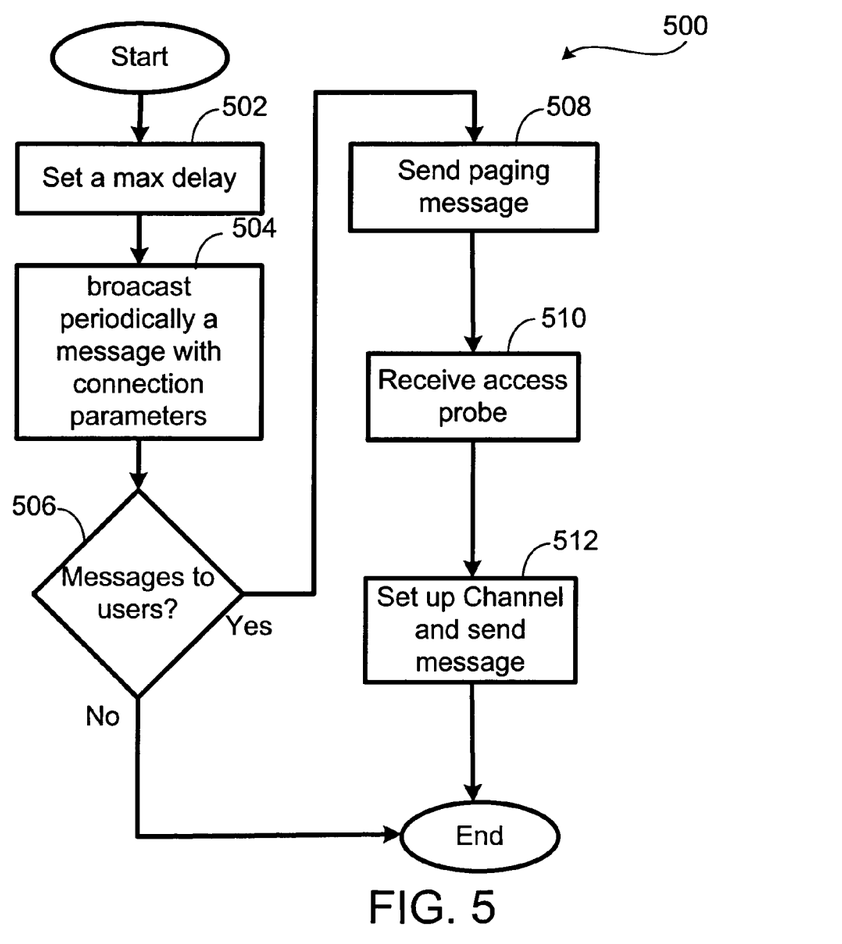
FIG. 5 is an exemplary embodiment of a base station process to avoid access probe collisions.

FIG. 5 is a flow chart of an exemplary of a base station process 500. The base station sets a maximum delay, step 502, for delaying access probes among other connection parameters and broadcasts periodically overhead messages with these connection parameters to all the user devices within its coverage area, step 504. The maximum delay is used by the receiving user devices during the generation a random delay before sending an access probe to the base station. The random delay generated by a user device preferably is smaller than the maximum delay.

After broadcasting the periodical overhead messages with the connection parameters, the base station checks whether there is any message destined to user devices, step 506. If a user starts a PTT communication, an announce message will be sent to one or more targeted user device. If there is an announce message destined to one or more users in the coverage of the base station, the base station sends one or more paging messages, step 508. When an access probe is received, step 510, from a user device, the base station sets up a communication channel to this user device, step 512, and sends the announce message to the user device. Although broadcasting the periodical overhead messages is described as before checking messages to users, the sequence is for illustration purposes only and these operations are independent of each other.

Figure 6:
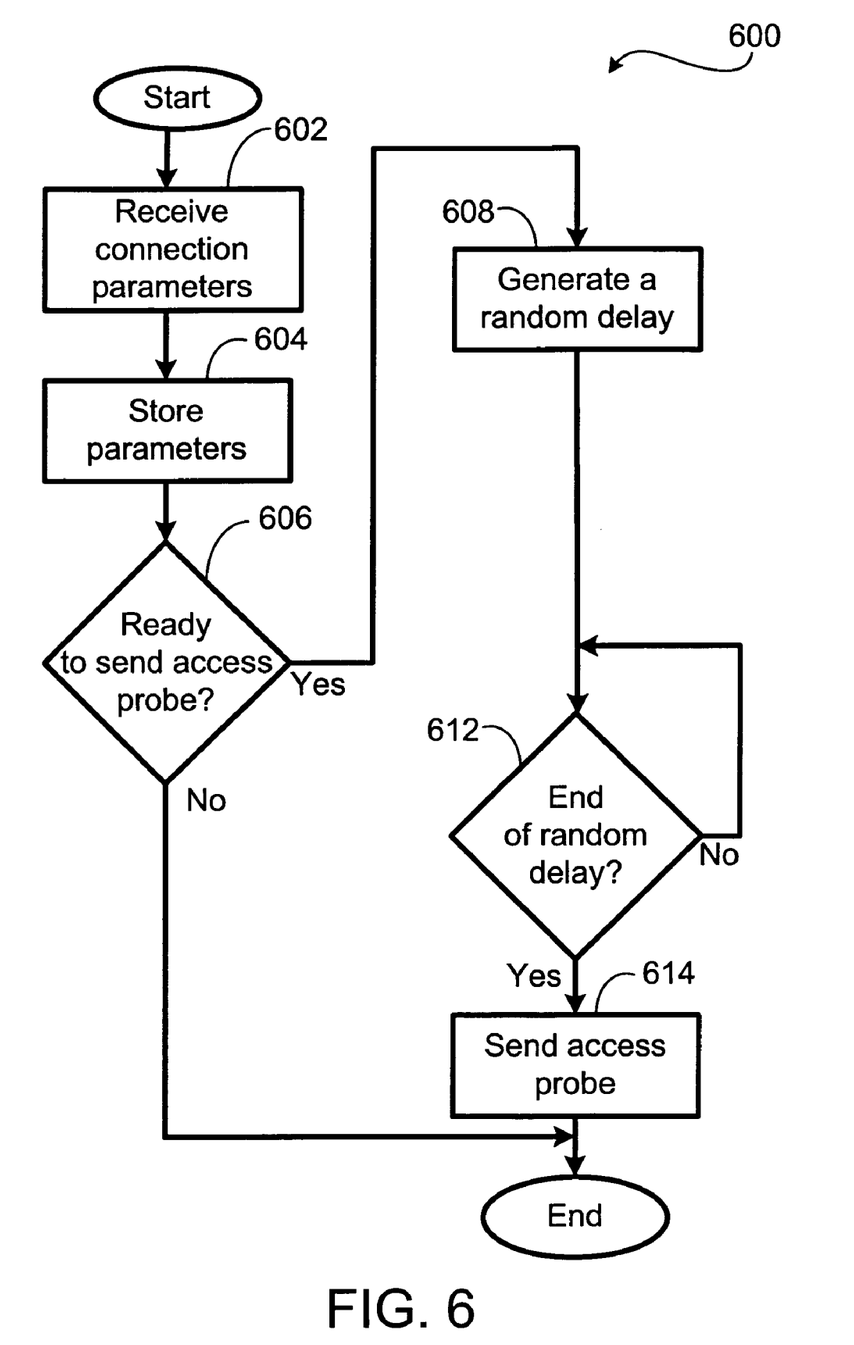
FIG. 6 is an exemplary embodiment of a wireless device process to avoid access probe collisions.

FIG. 6 is a flow chart for one embodiment of a user device process 600. The user device receives periodically overhead messages with connection parameters, step 602, from the base station, and these connection parameters are stored in the user device, step 604. When the user device is ready to send an access probe to the base station, step 606, either responding to a paging message, originating a channel request, or otherwise requesting access to the base station, the user device generates a random delay that is between 0 and the maximum delay, step 608. After generating the random delay, the user device waits for the expiration of the random delay, step 612. After the expiration of the random delay period, the user device sends an access probe to the base station, step 614. Because of the random nature of the delay generated by each user device, each user device sends its access probe at a different time and consequently the collision of the access probes at the base station in a CDMA2000 network is reduced.

The following is a simplified description of a use scenario of the present apparatus and method. John, David and Mary are members of a PTT communication group and their PTT communications are processed through a high bandwidth, CDMA2000 compatible network. Each of their devices continuously receives messages with connection parameters from their respective base stations and these connection parameters are used by their wireless device when communicating with the respective base stations. When John wants to make a PTT communication to both David and Mary, John presses a PTT button and activates the PTT feature. The user device needs to send a call request message to a server through the base station. Before sending the call request message, the user device generates a random delay that is lesser than the maximum random delay set by the connection parameters. At the end of the random delay period, the user device sends an access probe to the base station. When the base station receives the access probe, it identifies the sending user device and sets up a communication channel between the base station and the user device. The call request message is then transmitted over the communication channel to the base station, and then to the server.

The server checks David and Mary's availability before granting the "floor" to John's user device. The server sends an announcement to the base stations that both David and Mary's devices are connected. The server sends announcement messages to the targeted user devices. The announcement messages are received by the base station serving the targeted user devices and the base station proceeds to page the targeted user devices. After receiving the paging message through a paging channel or a control channel from the base station, each of the targeted user devices generates a random delay, and at the end of the random delay sends an access probe through the reverse enhanced access channel to the base station. Because the random delays are different in the targeted user devices, the access probes are transmitted at different time by each user device, and the chance of collision of these access probes at the receiving base station is reduced when David and Mary's user devices send access probes with same radio frequency. After the access probes are received, the base station sets up a communication channel to each user device and transmits the announcement message to each user device. After confirming the availability of the targeted devices, the server will grant the floor to John's user device and the PTT communication can then begin.

Although the apparatus and method have been described as solving the access probe collisions during a PTT communication, the same collision may also occur for other multi-user applications running on a high bandwidth wireless network that uses an enhanced access channel. Multi-user applications that involve multiple users simultaneously, or almost simultaneously, communicating over a wireless network with a base station, such as during in an online gaming over the wireless network, will face access probe collision problem as the PTT communication. Adding a random delay will also reduce collisions for these applications.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-6, the steps illustrated do not require or imply any particular order of actions. The actions may be executed in sequence or in parallel. The method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for reducing access probe collisions in a high bandwidth wireless network over which push-to-talk (PTT) communications occur between a plurality of user devices, wherein access probes are transmitted on a reverse channel by the plurality of user devices to a base station in response to a paging message, comprising:
    receiving at one or more targeted user devices a first message periodically broadcasted from the base station, wherein the first message is broadcasted prior to the paging message and includes a maximum delay factor set to minimize a probability of collision between the access probes, the access probes transmitted by each of said one or more targeted user devices in response to receiving the paging message, wherein the paging message is sent by the base station in response to a call message indicating a request to initiate a PTT communication and the first message is periodically broadcasted in an overhead message comprising connection parameters to user devices within a coverage area of the base station;
    receiving at the one or more targeted user devices the paging message from the base station through a control channel or a paging channel;
    generating a single delay that is random, wherein the generated random single delay is between zero and the maximum delay factor; and
    at the end of the generated random single delay, transmitting the access probe over the reverse channel to the base station in response to the paging message.

2. The method of claim 1, wherein the reverse channel is a reverse enhanced access channel.

3. The method of claim 1, wherein the high bandwidth wireless network is a Code Division Multiple Access 2000 (CDMA2000) compatible network.

4. A user device capable of transmitting and receiving radio signals, as part of a push-to-talk (PTT) communication, from a remote base station in a high bandwidth wireless communication network on which push-to-talk (PTT) communications occur between a plurality of user devices, the user device comprising:
    a transceiver for transmitting and receiving targeted messages from the base station through the high bandwidth wireless communication network via a control channel or a paging channel;
    a controller in communication with the transceiver for receiving messages from the base station through the high bandwidth wireless communication network, including targeted paging messages;
    a storage unit in communication with the controller for storing communication parameters received from the base station;
    a user interface unit in communication with the controller for interfacing with users; and a single delay generator for generating a single delay that is random based on a communication parameter stored in the storage unit, wherein said communication parameter is periodically broadcasted from the base station and is received prior to the targeted paging message, the communication parameter set to minimize a probability of collision between multiple access probes, wherein an access probe is generated in response to receipt of the targeted paging message and the random delay generator generates the random delay before the access probe is sent to the base station, and wherein the paging message is sent by the base station in response to a call message indicating a request to initiate a PTT communication and the communication parameter is periodically broadcasted in an overhead message comprising connection parameters to user devices within a coverage area of the base station.

5. The user device of claim 4, wherein the transceiver is capable of transmitting the targeted paging messages through a reverse enhanced access channel.

6. The user device of claim 4, wherein the high bandwidth wireless network is a Code Division Multiple Access 2000 (CDMA2000) compatible network.

7. A non-transitory computer-readable storage medium on which is stored a computer program for reducing access probe collisions in a high bandwidth wireless network on which push-to-talk (PTT) communications occur between a plurality of user devices, wherein access probes are transmitted on a reverse channel by the plurality of user devices to a base station in response to a paging message, the computer program comprising computer instructions that when executed by a communication server performs the steps of:
    receiving at one or more targeted user devices a first message from the base station, wherein the first message includes a maximum delay factor set to minimize a probability of collision between access probes, wherein said first message is periodically broadcasted from the base station and is received prior to the paging message, the access probes transmitted by each of said one or more targeted user devices in response to receiving the paging message, and wherein the paging message is sent by the base station in response to a call message indicating a request to initiate a PTT communication and the first message is periodically broadcasted in an overhead message comprising connection parameters to user devices within a coverage area of the base station;
    generating a single delay that is random, wherein the generated random delay is between zero and the maximum delay factor; and
    at the end of the generated random delay, transmitting the access probe in response to a paging message over the reverse channel to the base station.

8. The non-transitory computer readable storage medium of claim 7, wherein the reverse channel is a reverse enhanced access channel.

9. The non-transitory computer readable storage medium of claim 7, wherein the high bandwidth wireless network is a Code Division Multiple Access 2000 (CDMA2000) compatible network.

10. A user device capable of transmitting and receiving radio signals, as part of a push-to-talk (PTT) communication, from a remote base station in a high bandwidth wireless communication network over which PTT communications occur between a plurality of user devices, the user device comprising:

transceiving means for transmitting and receiving targeted messages from the base station through the high bandwidth wireless communication network;

controlling means in communication with the transceiving means for receiving messages from the base station through the high bandwidth wireless communication network, including paging messages;

storage means in communication with the controlling means for storing communication parameters received from the base station;

user interfacing means in communication with the controlling means for interfacing with users; and     delay generating means for generating a single delay that is random based on a communication parameter stored in the storage unit, wherein said communication parameter is periodically broadcasted from the base station and is received prior to the paging message, the communication parameter set to minimize a probability of collision between multiple access probes, wherein the random delay generating means generates the random delay before the transceiving means transmits the access probe to the base station in response to the paging message, and wherein the paging message is sent by the base station in response to a call message indicating a request to initiate a PTT communication and the communication parameter is periodically broadcasted in an overhead message comprising connection parameters to user devices within a coverage area of the base station.

11. The user device of claim 10, wherein the transceiving means is capable of transmitting the targeted messages through a reverse enhanced access channel.

12. The user device of claim 10, wherein the high bandwidth wireless network is a Code Division Multiple Access 2000 (CDMA2000) compatible network.

13. The user device of claim 10, wherein, at the end of the random delay, the controlling means is configured to transmit the access probe in response to the paging message through a reverse enhanced access channel to the base station.

14. A method for reducing access probe collisions in a high bandwidth wireless network over which a multi-user application is shared by a plurality of user devices, wherein access probes are transmitted in response to a paging message on a reverse channel by the plurality of user devices to a base station, comprising:

receiving at one or more targeted user devices a first message periodically broadcasted from the base station, wherein the first message is broadcasted prior to the paging message and includes a maximum delay factor set to minimize a probability of collision between access probes, the access probes transmitted by each of said one or more targeted user devices in response to receiving the paging message, wherein the paging message is sent by the base station in response to a call message indicating a request to initiate a PTT communication and the first message is periodically broadcasted in an overhead message comprising connection parameters to user devices within a coverage area of the base station;

receiving at the one or more targeted user devices the paging message from the base station through a control channel or a paging channel,     generating a single delay that is random, wherein the generated random single delay is between zero and the maximum delay factor; and     at the end of the generated random single delay, transmitting the access probe over the reverse channel to the base station in response to the paging message.

15. The method of claim 14, wherein the reverse channel is a reverse enhanced access channel.

16. The method of claim 14, wherein the high bandwidth wireless network is a Code Division Multiple Access 2000 (CDMA2000) compatible network.

\* \* \* \* \*